US010614590B2

(12) United States Patent
Ogata et al.

(10) Patent No.: US 10,614,590 B2
(45) Date of Patent: Apr. 7, 2020

(54) APPARATUS FOR DETERMINATION OF INTERFERENCE BETWEEN VIRTUAL OBJECTS, CONTROL METHOD OF THE APPARATUS, AND STORAGE MEDIUM

(71) Applicant: CANON KABUSHIKI KAISHA, Tokyo (JP)

(72) Inventors: Naoko Ogata, Tokyo (JP); Yasumi Tanaka, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/015,067

(22) Filed: Jun. 21, 2018

(65) Prior Publication Data
US 2018/0374236 A1    Dec. 27, 2018

(30) Foreign Application Priority Data

Jun. 27, 2017 (JP) .................................. 2017-124802

(51) Int. Cl.
| G06T 7/73 | (2017.01) |
| G06T 19/00 | (2011.01) |
| G06K 9/00 | (2006.01) |
| G06F 3/0346 | (2013.01) |
| G06F 3/01 | (2006.01) |

(Continued)

(52) U.S. Cl.
CPC ............... G06T 7/73 (2017.01); G06F 3/011 (2013.01); G06F 3/016 (2013.01); G06F 3/017 (2013.01); G06F 3/0304 (2013.01); G06F 3/0346 (2013.01); G06F 3/147 (2013.01); G06F 3/167 (2013.01); G06K 9/00355 (2013.01);

(Continued)

(58) Field of Classification Search
CPC .. G06T 7/73; G06F 3/011; G06F 3/016; G06F 3/017; G06F 3/0304; G06F 3/0346
See application file for complete search history.

(56) References Cited

U.S. PATENT DOCUMENTS

| 2009/0066725 A1* | 3/2009 | Nogami | A63F 13/10 |
| | | | 345/632 |
| 2009/0259443 A1* | 10/2009 | Fujiki | G06F 17/5009 |
| | | | 703/1 |
| 2017/0038830 A1* | 2/2017 | Clement | G06T 19/006 |

FOREIGN PATENT DOCUMENTS

| JP | 2003337962 A | 11/2003 |
| JP | 2006302035 A | 11/2006 |
| JP | 200859375 A | 3/2008 |

* cited by examiner

Primary Examiner — Sarah Lhymn
(74) Attorney, Agent, or Firm — Canon U.S.A., Inc. IP Division

(57) ABSTRACT

An information processing apparatus includes an obtaining unit configured to obtain position and orientation information and shape information about a real holding object holding a plurality of virtual objects, a setting unit configured to set a virtual object held by the holding object as an interference virtual object and to set a virtual object that is not held by the holding object as an interfered virtual object, based on the position and orientation information and the shape information about the plurality of virtual objects and the position and orientation information and shape information about the holding object, and a determination unit configured to determine presence or absence of interference between the interference virtual object and the interfered virtual object, based on the position and orientation information and the shape information about the interference virtual object and the position and orientation information and the shape information about the interfered virtual object.

20 Claims, 11 Drawing Sheets

(51) Int. Cl.
*G06F 3/16* (2006.01)
*G06F 3/147* (2006.01)
*G06F 3/03* (2006.01)
*G06F 3/14* (2006.01)

(52) U.S. Cl.
CPC .............. *G06T 19/006* (2013.01); *G06F 3/14* (2013.01); *G09G 2340/125* (2013.01)

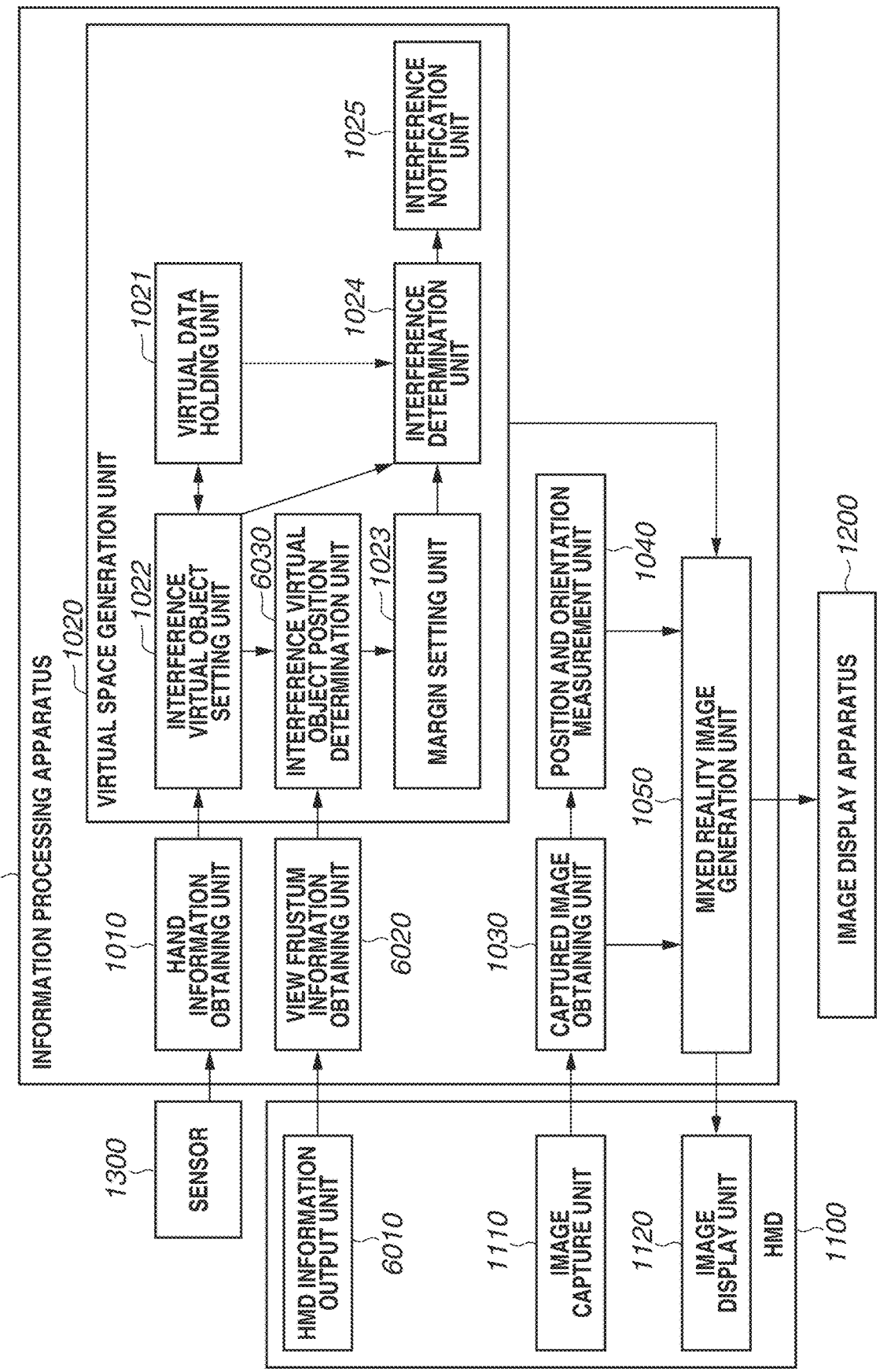

VIRTUAL SPACE OF USER B

VIRTUAL SPACE OF USER A

APPARATUS FOR DETERMINATION OF INTERFERENCE BETWEEN VIRTUAL OBJECTS, CONTROL METHOD OF THE APPARATUS, AND STORAGE MEDIUM

BACKGROUND

Field of the Disclosure

The present disclosure relates to an interference determination technique between virtual objects.

Description of the Related Art

In recent years, it is demanded to shorten a period of evaluation using prototypes and to reduce a cost for the evaluation in a design and manufacturing field. A mixed reality (MR) system has been introduced to perform virtual assessment of ease of assembly and maintenance by using design (shape and design) data created by a computer-aided design (CAD) system.

As a representative evaluation item, there is an item for performance of evaluation with only a virtual component even if a real component does not exist, as to whether it is possible to perform work without causing a tool to interfere with other components than a desired component and as to whether an appropriate gap is secured between the tool and the component.

The MR system for performance of such evaluation is demanded to have a function of presenting whether an experiencing person (a user) himself or herself moves a virtual object (for example, a tool) such that the virtual object interferes with another virtual object (component). In addition, the MR system is demanded to have a function to present whether a gap is properly secured between the tool that the user is moving and the component. (For example, see Japanese Patent Application Laid-Open No. 2008-59375, Japanese Patent Application Laid-Open No. 2003-337962, and Japanese Patent Application Laid-Open No. 2006-302035)

For example, in a method discussed in Japanese Patent Application Laid-Open No. 2008-59375 and the like, a virtual object as an operation target object is superimposed on an instruction tool held by a user by hand, and interference determination is performed between the instruction tool and the virtual object fixed in a virtual space. However, with this method, an issue remains that it is necessary to preset and superimpose the virtual objects to be set as the instruction tool and the operation target object from among a plurality of virtual objects. There is also an issue that a sense of immersion is hindered when there is a large difference between a shape of the instruction tool and a shape of the virtual object, even if the superimposition is performed.

SUMMARY

The present disclosure provides an information processing apparatus capable of performing interference determination upon selecting a virtual object to be used for the interference determination from among a plurality of virtual objects without presetting.

According to an aspect of the present disclosure, an information processing apparatus includes a holding unit configured to hold position and orientation information and shape information about a plurality of virtual objects in a virtual space, an obtaining unit configured to obtain position and orientation information and shape information about a real holding object holding the plurality of virtual objects, a setting unit configured to set a virtual object held by the holding object as an interference virtual object and to set a virtual object that is not held by the holding object as an interfered virtual object, based on the position and orientation information and the shape information about the plurality of virtual objects and the position and orientation information and shape information about the holding object, a determination unit configured to determine presence or absence of interference between the interference virtual object and the interfered virtual object, based on the position and orientation information and the shape information about the interference virtual object and the position and orientation information and the shape information about the interfered virtual object, and a generation unit configured to generate the virtual space, based on the information held by the holding unit and a determination result of the determination unit.

Further features of the present disclosure will become apparent from the following description of exemplary embodiments with reference to the attached drawings.

BRIEF DESCRIPTION OF THE DRAWINGS

FIG. 6 is a block diagram illustrating an example of a functional configuration of a system according to one or more aspects of the present disclosure.

DESCRIPTION OF THE EMBODIMENTS

Hereinafter, an exemplary embodiment of the present disclosure will be described with reference to the accompanying drawings. It should be noted that the below-described exemplary embodiments illustrate an example in a case where the present disclosure is concretely practiced and are one of specific exemplary embodiments of a configuration set forth in claims.

Figure 1:
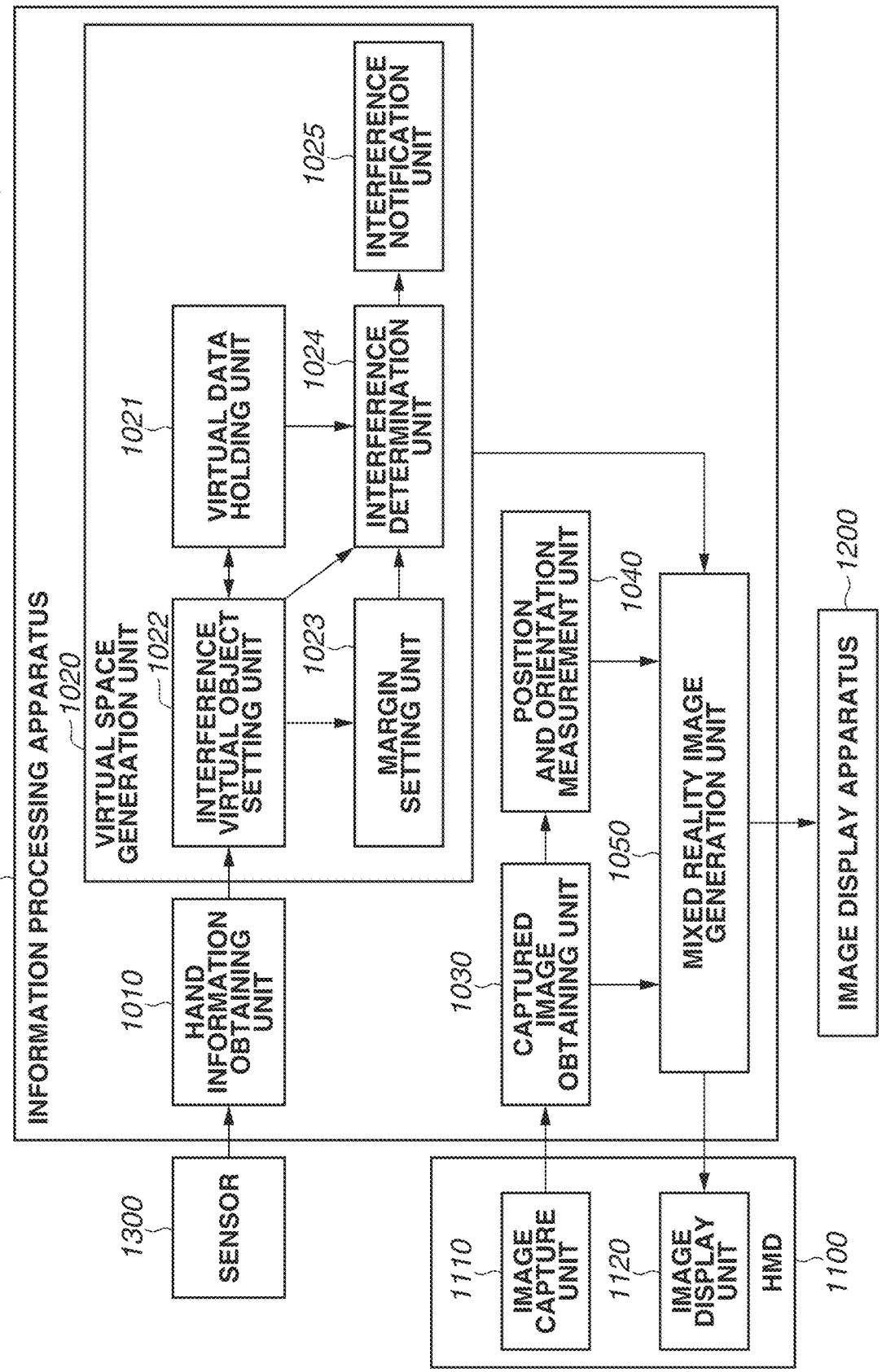
FIG. 1 is a block diagram illustrating an example of a functional configuration of a system according to one or more aspects of the present disclosure.

FIG. 1 is a block diagram illustrating an example of a functional configuration of a system according to a first exemplary embodiment.

A system S according to the present exemplary embodiment includes an information processing apparatus 1000, a head mounted display (HMD) 1100 which is an example of a display apparatus configured to be attachable to a head of a user, an image display apparatus 1200, and a sensor 1300.

The information processing apparatus 1000 includes a hand information obtaining unit 1010, a virtual space generation unit 1020, a captured image obtaining unit 1030, a position and orientation measurement unit 1040, and a mixed reality image generation unit 1050. The HMD 1100 includes an image capture unit 1110 and an image display unit 1120.

The information processing apparatus 1000 and the HMD 1100 are connected to each other to enable data communication therebetween. Further, the information processing apparatus 1000 and the HMD 1100 can be wired connected or wirelessly connected.

Figure 2:
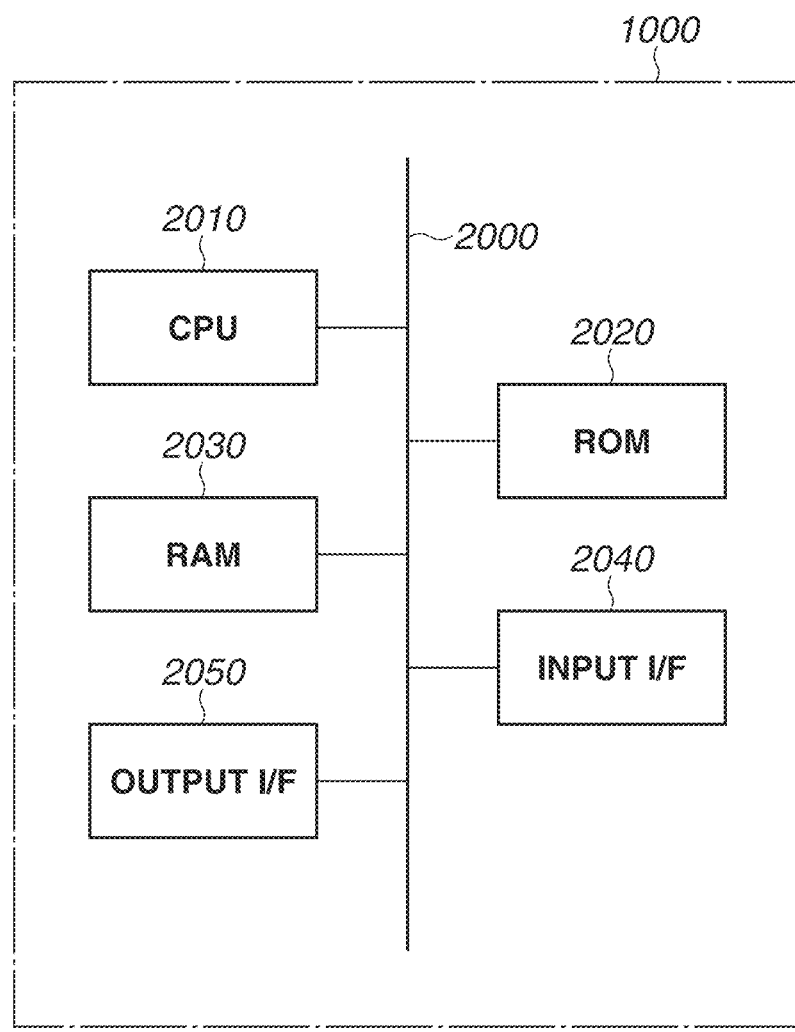
FIG. 2 illustrates an example of a hardware configuration of an information processing apparatus.

FIG. 2 illustrates an example of a hardware configuration of the information processing apparatus 1000.

The information processing apparatus 1000 includes a central processing unit (CPU) 2010, a read only memory (ROM) 2020, a random access memory (RAM) 2030, an input interface (I/F) 2040, and an output I/F 2050.

The CPU 2010 comprehensively controls each device connected via a bus 2000. The CPU 2010 reads and executes a processing step and a program stored in a read-only memory (the ROM 2020). Various programs, device drivers, and the like that are related to the present exemplary embodiment including an operating system (OS) are stored in the ROM 2020. These various programs and the like are temporarily stored in the RAM 2030. Various programs and the like are appropriately executed by the CPU 2010, and operate each functional unit of the information processing apparatus 1000.

The input I/F 2040 performs input as an input signal from an external apparatus (for example, a display apparatus, an operation apparatus, and the like) in a format processable by the information processing apparatus 1000.

The output I/F 2050 performs output as an output signal to an external apparatus (a display apparatus) in a format processable by the display apparatus.

Hereinafter, a functional configuration of the information processing apparatus 1000 and the like will be described below with reference to FIGS. 1, 2, and 3.

[Functional Configuration of Information Processing Apparatus 1000]

Figure 3:
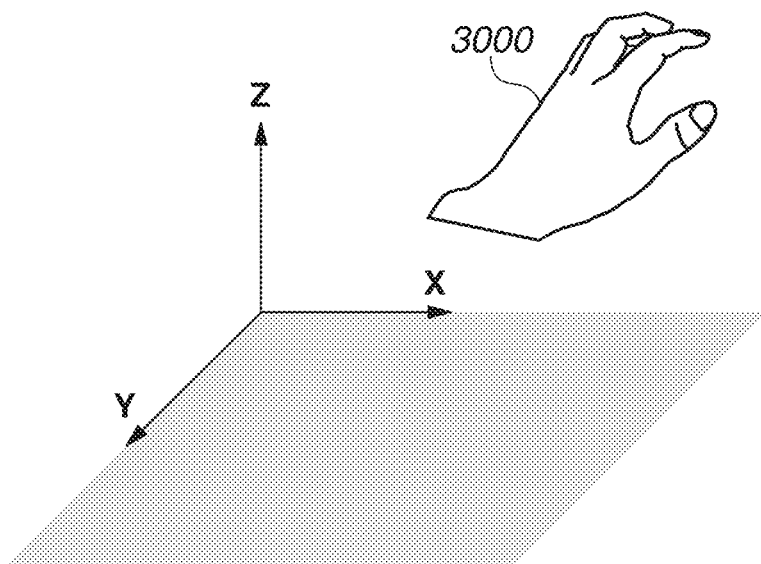
FIG. 3 is a diagram for describing a world coordinate system obtained by the information processing apparatus via a sensor.

FIG. 3 is a diagram for describing a world coordinate system obtained by the information processing apparatus 1000 via a sensor 1300. It should be noted that, as illustrated in FIG. 3, the world coordinate system is defined as a coordinate system in which one point of a real space is defined as an origin and three axes orthogonal to one another are further defined as X axis, Y axis, and Z axis.

The hand information obtaining unit 1010 of the information processing apparatus 1000 obtains position and orientation information representing a position and orientation of a hand 3000 of the user including fingers in the world coordinate system measured via the sensor 1300. The hand information obtaining unit 1010 also obtains a three-dimensional polygon model representing a shape of the hand 3000 as shape information. The obtained position and orientation information and the shape information about the hand 3000 of the user are input to an interference virtual object setting unit 1022. In this way, the hand information obtaining unit 1010 obtains the position and orientation and the shape information about a holding object (the hand 3000 of the user) holding a virtual object in a virtual space.

The virtual space generation unit 1020 includes a virtual data holding unit 1021, the interference virtual object setting unit 1022, a margin setting unit 1023, an interference determination unit 1024, and an interference notification unit 1025.

The virtual data holding unit 1021 holds information about the virtual space such as data related to the virtual object constituting the virtual space (the position and orientation information and the shape information), and data related to a light source irradiated in the virtual space. The information about the virtual space is input to the interference virtual object setting unit 1022 and the interference determination unit 1024.

The interference virtual object setting unit 1022 identifies a virtual object held by the hand 3000, based on the position and orientation information and the shape information about the hand 3000 obtained by the hand information obtaining unit 1010 and the position and orientation information and the shape information about the virtual object held in the virtual data holding unit 1021. The interference virtual object setting unit 1022 also sets the virtual object held by the hand 3000 as an interference virtual object, and sets a virtual object that is not held by the hand 3000 as an interfered virtual object.

The information processing apparatus 1000 changes the position and orientation of the virtual object identified to be held by the hand 3000 in the interference virtual object setting unit 1022 so as to follow the position and orientation of the hand 3000.

A method for identifying as to whether the virtual object is held by the hand 3000 can be a known method such as a method for determining as to whether a predetermined holding condition is satisfied.

In the description of the present exemplary embodiment, a spherical virtual object is placed at fingertips, joints, and a palm of the hand 3000 to determine whether the virtual object in the virtual space and the spherical virtual object placed in the hand 3000 interfere with each other. In addition, although the description will be given by using a known method in which the virtual object is identified to be held in a case where a positional relationship of the spheres that interfere with each other satisfies the condition, the present disclosure is not limited thereto.

The information processing apparatus 1000 inputs the set information about the virtual object to the margin setting unit 1023 and the interference determination unit 1024. Since the information processing apparatus 1000 also changes a position and orientation of the interference virtual object so as to follow the position and orientation of the hand 3000, interference virtual object information and the position and orientation information about the hand 3000 are held in the virtual data holding unit 1021.

The margin setting unit 1023 expands the interference virtual object set by the interference virtual object setting unit 1022 so as to set an area (a margin) for checking whether an appropriate gap amount can be secured between the interference virtual object and the interfered virtual object. The margin setting unit 1023 then generates a margin in the virtual space.

The margin can be used to warn in advance of interference between the interference virtual object and the interfered virtual object. Information about the set area (margin) is input to the interference determination unit 1024.

The interference determination unit 1024 includes, for example, a virtual object interference determination unit and a margin interference determination unit, which are not illustrated. The virtual object interference determination unit determines whether the interference virtual object set via the interference virtual object setting unit 1022 interferes with the interfered virtual object. The margin interference determination unit determines whether the margin set by the margin setting unit 1023 interferes with the interfered virtual object. The interference determination unit 1024 outputs each interference determination result to the interference notification unit 1025.

The interference notification unit 1025 includes, for example, a virtual object interference notification unit and a margin interference notification unit, which are not illustrated. In a case where the virtual object interference determination unit of the interference determination unit 1024 determines that there is interference between the interference virtual object and the interfered virtual object, the virtual object interference notification unit obtains an interference position and sets an interference notification flag to ON. In addition, in a case where the margin interference determination unit of the interference determination unit 1024 determines that there is interference between the margin and the interfered virtual object, the margin interference notification unit obtains an interference position and sets the interference notification flag to ON.

The virtual space generation unit 1020 generates a virtual space based on the position information and the margin information about the virtual object obtained at each unit, the notification flag of interference determination, and the like. Information of the generated virtual space (virtual space information) is input to the mixed reality image generation unit 1050.

The captured image obtaining unit 1030 obtains an image of a real space (a real space image) captured by the image capture unit 1110 and inputs the real space image to the position and orientation measurement unit 1040 and the mixed reality image generation unit 1050.

The position and orientation measurement unit 1040 performs image processing using the real space image obtained by the captured image obtaining unit 1030 and extracts information which is characteristic (characteristic information) such as points and lines in the image to thereby measure a position and orientation of a measurement target (for example, the user). The position and orientation measurement unit 1040 inputs the position and orientation information as a measurement result to the mixed reality image generation unit 1050.

In the present exemplary embodiment, position and orientation measurement by image processing is described. However, a position and orientation of a target object can be measured using infrared light, ultrasonic waves, or a magnetic sensor. Further, the position and orientation of the target object can be measured using a depth sensor, or the position and orientation can be mechanically measured.

The mixed reality image generation unit 1050 generates a virtual space image based on the virtual space generated by the virtual space generation unit 1020 and the measurement result of the position and orientation measurement unit 1040. The mixed reality image generation unit 1050 also superimposes the virtual space image on the real space image obtained by the captured image obtaining unit 1030 and generates an image of a mixed reality space (a mixed reality image). The mixed reality image generation unit 1050 outputs the generated mixed reality image to the image display unit 1120 of the HMD 1100.

Mixed reality images can be displayed simultaneously on the image display unit 1120 and the image display apparatus 1200. The image display unit 1120 is not limited to HMD. The image display unit 1120 can be any apparatus that can display an image, so that it can be a display terminal such as a tablet or a smartphone. Since a known technique can be used for a technique generating a virtual space seen from a predetermined position, a detailed description thereof will be omitted.

Each functional unit described above can be implemented by the CPU 2010 loading a program stored in the ROM 2020 into the RAM 2030 and executing processing according to each flowchart described below. For example, in the case of configuring hardware as a substitute for software processing using the CPU 2010, a computing unit and a circuit corresponding to the processing of each functional unit described herein can be configured.

[Functional Configuration of HMD 1100]

The HMD 1100 is an example of a display apparatus including liquid crystal screens (display screens) for a right eye and a left eye. Each of the display screens is attached so as to be positioned before the right eye and the left eye of the user who wears the HMD 1100 on the head. In addition, images with parallax are stereo-displayed on the left and right display screens.

The image capture unit 1110 captures the real space seen by the user wearing the HMD 1100 on the head and inputs the captured image as the real space image to the information processing apparatus 1000. The image display unit 1120 displays the mixed reality image generated by the information processing apparatus 1000 on the display screen.

Description will be given on an assumption that the HMD 1100 according to the present exemplary embodiment is a video see-through type HMD that displays the mixed reality image generated based on the image captured by the image capturing apparatus on the display apparatus. In addition, for example, it is also possible to use an optical see-through type HMD that displays a virtual space image superimposed on a display medium which can be observed through the real space.

[Functional Configuration of Sensor 1300]

The sensor 1300 measures a position and orientation of the hand 3000 including the fingers. The sensor 1300 can also output a three-dimensional polygon model simulating the shape of the hand 3000 in real time based on the measurement result. The sensor 1300 inputs the position and orientation measurement result and shape information about the polygon model to the information processing apparatus 1000.

For the sensor 1300, for example, Leap Motion® provided by Leap Motion, Inc. can be used. The Leap Motion can measure a position and orientation of a hand including fingers, detect an area of the hand from a built-in stereo camera, and output a three-dimensional polygon model simulating the shape of the hand.

Further, using a depth sensor of Kinect and the like of Microsoft Corporation, for example, a position and orientation of a hand and fingers can be estimated. Furthermore, it can be possible to use a method for repeatedly performing calculation from an initial position based on a depth image of a shape of a hand obtained by the depth sensor and optimizing the cost to generate a three-dimensional polygon model estimating the orientation of the hand and the fingers. It is also possible to use a method for extracting an area of a hand by image processing and measuring position information by estimation of a depth by stereo matching or simultaneous localization and mapping (SLAM).

Figure 4:
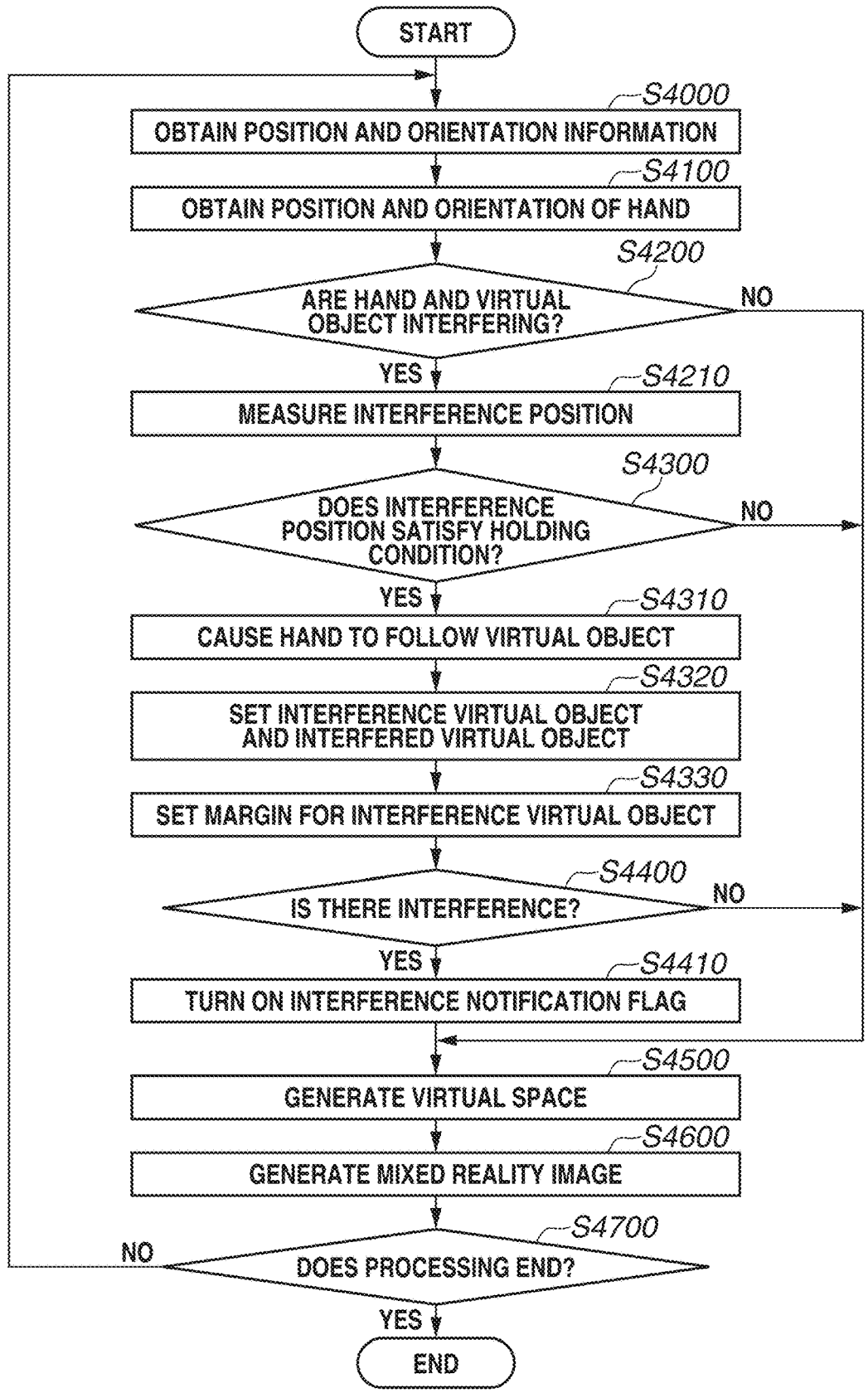
FIG. 4 is a flowchart illustrating an example of a processing procedure performed by the information processing apparatus.

FIG. 4 is a flowchart illustrating an example of a processing procedure performed by the information processing apparatus 1000.

Each processing illustrated in FIG. 4 specifically indicates processing in which the information processing apparatus 1000 generates a mixed reality space image and outputs the mixed reality space image to the HMD 1100 or the image display apparatus 1200.

Each processing illustrated in FIG. 4 is executed mainly by each functional unit implemented by the CPU 2010.

FIGS. 5A to 5D are diagrams for description of a series of processing in which the information processing apparatus 1000 sets a margin. Specifically, in the virtual space (see FIG. 5A) where there are a plurality of virtual objects (a virtual object 5000 and a virtual object 5100), the information processing apparatus 1000 decides the virtual object 5000 held by the user's hand as a virtual object to be used for interference determination and sets the margin.

Hereinafter, the processing will be described in detail below with reference to FIGS. 4 and 5.

The captured image obtaining unit 1030 obtains a real space image from the image capture unit 1110. The position and orientation measurement unit 1040 measures a position and orientation of the measurement target based on the obtained image, and obtains the position and orientation information (step S4000).

The hand information obtaining unit 1010 obtains a position and orientation in the world coordinate system of a hand 5200 measured by the sensor 1300 (step S4100).

Figure 5B:
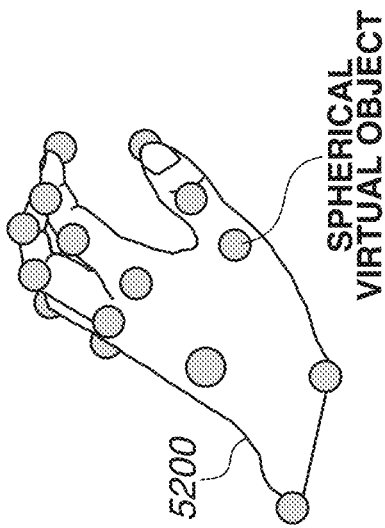
FIGS. 5A to 5D are diagrams for describing a series of processing in which the information processing apparatus sets a margin.

As illustrated in FIG. 5B, the interference virtual object setting unit 1022 arranges a spherical virtual object on a fingertip, a joint, a palm, and the like of the hand 5200 based on shape information about the hand 5200.

The interference determination unit 1024 determines presence or absence of interference between the hand 5200, the virtual object 5000, and the virtual object 5100 (step S4200). Specifically, the presence or absence of the interference is determined based on the position and orientation information and the shape information about the virtual object and the position and orientation information and the shape information about the spherical virtual object.

For example, the interference determination is implemented in the following order. First, triangle polygons are extracted one by one from each virtual object, and it is determined whether the triangle polygons intersect each other. This process is performed for all combinations of the triangle polygons, and when there is at least one combination of the triangle polygons which intersect each other, it is determined that there is interference. However, the method for implementation of the interference determination in the present disclosure is not limited thereto.

When the interference determination unit 1024 determines that one of the plurality of virtual objects interferes with the spherical virtual object (YES in step S4200), the processing proceeds to step S4210. Otherwise (NO in step S4200), the processing proceeds to step S4500.

The interference virtual object setting unit 1022 obtains position information about the spherical virtual object interfering with the virtual object (step S4210).

The interference virtual object setting unit 1022 determines whether an interference position of the spherical virtual object satisfies a predetermined holding condition (step S4300). When the condition is satisfied (YES in step S4300), the processing proceeds to step S4310. Otherwise (NO in step S4300), the processing proceeds to step S4500.

Figure 5D:
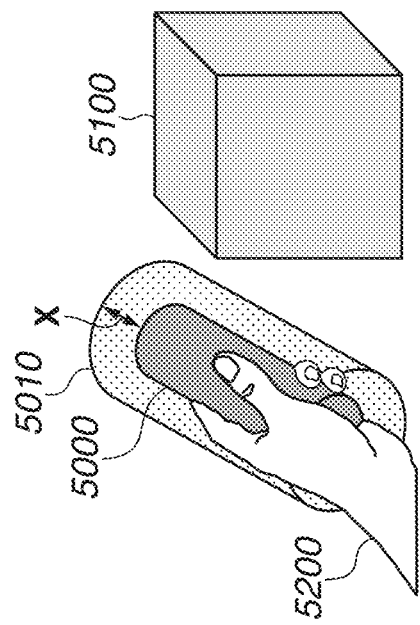
Figure 5A:
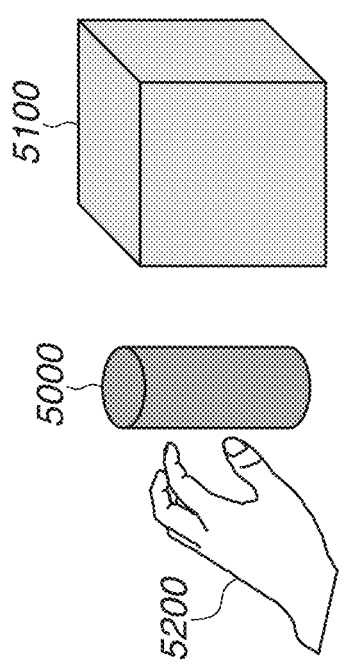
Figure 5C:
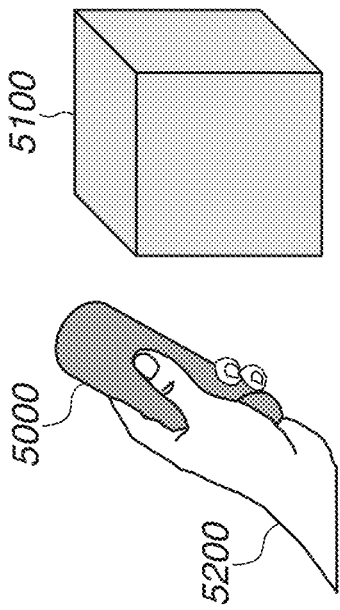

The interference virtual object setting unit 1022 changes, in the virtual data holding unit 1021, the position and orientation so that the virtual object 5000 satisfying the holding condition follows the position and orientation of the hand 5200 of the user as illustrated in FIG. 5C (step S4310).

The interference virtual object setting unit 1022 sets the virtual object 5000 satisfying the holding condition as an interference virtual object and the virtual object 5100 not satisfying the holding condition as an interfered virtual object (step S4320).

Although a method for setting only the held virtual object as the interference virtual object will be described in the present exemplary embodiment, the present disclosure is not limited thereto. For example, a virtual object to be added to the virtual object set as the interference virtual object by the interference virtual object setting unit 1022 can be selected via the input I/F 2040, and the added virtual object can be set to be included in the interference virtual object. Alternatively, the hand holding the virtual object can be set to be included in the interference virtual object.

The margin setting unit 1023 sets a margin 5010 for the interference virtual object 5000 set by the interference virtual object setting unit 1022 (step S4330). The margin setting unit 1023 generates the margin 5010 as the virtual object in the virtual space.

As illustrated in FIG. 5D, the margin 5010 has a specified gap amount X from an interference surface so that it can be checked that an appropriate gap amount is secured between the interference virtual object 5000 and the interfered virtual object 5100.

It should be noted that a method for setting the margin includes a method using Minkowski sum of an interference virtual object and a sphere a diameter of which is the specified gap amount. In addition, for example, in a method for specification of the gap amount X, the gap amount X can be specified by input using a mouse, a keyboard, or the like operated by the user, by gesture input, or by input using voice of the user. Alternatively, the gap amount X can be specified via a database which can determine the gap amount X based on a type of the interference virtual object, or can be specified based on a size of the interference virtual object.

Further, the size of the interference virtual object can be calculated using three sides (width, height, and depth) of a bounding box, or can be calculated based on a diameter of a bounding sphere.

Although a method for setting the margin for the interference virtual object at all times will be described in the present exemplary embodiment, but the present disclosure is not limited thereto. For example, the user can select whether a margin is to be set for the interference virtual object via the input I/F 2040, and then the user can select whether the margin is to be set by inputting the selection information to the margin setting unit 1023.

In addition, although the method for generating the margin in the virtual space at all times and presenting the margin so that it can be seen by the user has been described in the present exemplary embodiment, the present disclosure is not limited thereto. That is, the user selects whether to display the margin 5010 via the input I/F 2040. Then, the user can select whether the margin is to be generated as a visual virtual object by inputting the selection information to the virtual space generation unit 1020.

Based on the position and orientation information and the shape information about the interference virtual object 5000, the interfered virtual object 5100, and the margin 5010, the interference determination unit 1024 determines presence or absence of interference between the interference virtual object and the interfered virtual object or interference between the margin and the interfered virtual object (step S4400).

When determining that interference is present one of between the interference virtual object and the interfered virtual object or between the margin and the interfered virtual object (YES in step S4400), the interference determination unit 1024 turns on an interference notification flag via the interference notification unit 1025 (step S4410). Otherwise (NO in step S4400), the processing proceeds to step S4500.

The virtual space generation unit 1020 generates a virtual space (step S4500). Specifically, the virtual space is generated based on data on the virtual space held by the virtual data holding unit 1021, the shape of the margin set by the margin setting unit 1023, and the interference notification flag of the interference notification unit 1025.

In a case where the interference notification flag is ON, the presence of interference is visually notified using color, for example, so that the user can understand the interference position. In addition, although a case using the visual interference notification method is used as an example in the present exemplary embodiment, the present disclosure is not limited thereto. That is, the presence of the interference can be notified audibly or tactually with sound or vibration, for example, or these notification methods can be combined with each other. Further, the interference between the interference virtual object and the interfered virtual object, and the interference between the margin and the interfered virtual object can be notified by different notification methods. Thereafter, the CPU 2010 turns off the interference notification flag.

The mixed reality image generation unit 1050 generates a virtual space image based on the virtual space generated by the virtual space generation unit 1020 and the position and orientation information obtained by the position and orientation measurement unit 1040 (step S4600). The CPU 2010 generates a mixed reality image by superimposing the virtual space image on the real space image obtained by the captured image obtaining unit 1030. The generated mixed reality image is output to the image display unit 1120 of the HMD 1100 or the image display apparatus 1200.

The information processing apparatus 1000 determines whether an instruction to end the present processing has been input by the user or whether conditions for ending the present processing have been satisfied (step S4700). When determining that the instruction to end the present processing has been input or it is determined that the conditions for ending the present processing have been satisfied (YES in step S4700), the CPU 2010 ends the processing. Otherwise (NO in step S4700), the processing returns to step S4000.

As described above, the information processing apparatus 1000 according to the present exemplary embodiment can set a virtual object held by the user among a plurality of virtual objects as a virtual object to be used for the interference determination. This makes it possible to select a virtual object to be used for the interference determination without presetting or the like.

In the first exemplary embodiment, the case of setting the margin with the specified gap amount regardless of the position of the interference virtual object has been described. In a second exemplary embodiment, an information processing apparatus, which can change a margin to be set according to whether an interference virtual object exists in a view frustum, will be described.

The functional configurations already described in the first exemplary embodiment are given the same reference numerals, and description thereof is omitted.

FIG. 6 is a block diagram illustrating an example of a functional configuration of a system according to the second exemplary embodiment.

A difference between the system according to the present exemplary embodiment and the system S illustrated in FIG. 1 is that an HMD 1100 has an HMD information output unit 6010, and that an information processing apparatus 1000 has a view frustum information obtaining unit 6020 and an interference virtual object position determination unit 6030.

The HMD information output unit 6010 obtains angle of view information about the HMD 1100. The obtained angle of view information is input to the view frustum information obtaining unit 6020 of the information processing apparatus 1000.

The view frustum information obtaining unit 6020 obtains not only the angle of view information input from the HMD information output unit 6010 but also a Near plane and a Far plane rendering a virtual space, and constructs a view frustum based on the obtained information. The view frustum information obtaining unit 6020 inputs information (view frustum information) related to the constructed view frustum to the interference virtual object position determination unit 6030.

Since a technique for constructing a predetermined view frustum is a known technique, a detailed description thereof will be omitted.

Based on the view frustum information obtained from the view frustum information obtaining unit 6020, the interference virtual object position determination unit 6030 determines whether a position of a virtual object set as an interference virtual object by an interference virtual object setting unit 1022 exists within or outside the view frustum. A determination result is input to a margin setting unit 1023.

Based on the determination result of the interference virtual object position determination unit 6030, the margin setting unit 1023 sets a margin for use within the view frustum for the interference virtual object existing within the view frustum, and sets a margin for use outside the view frustum for the interference virtual object existing outside the view frustum, to display the margins to a user. The set margin information is input to the interference determination unit 1024.

Figure 7:
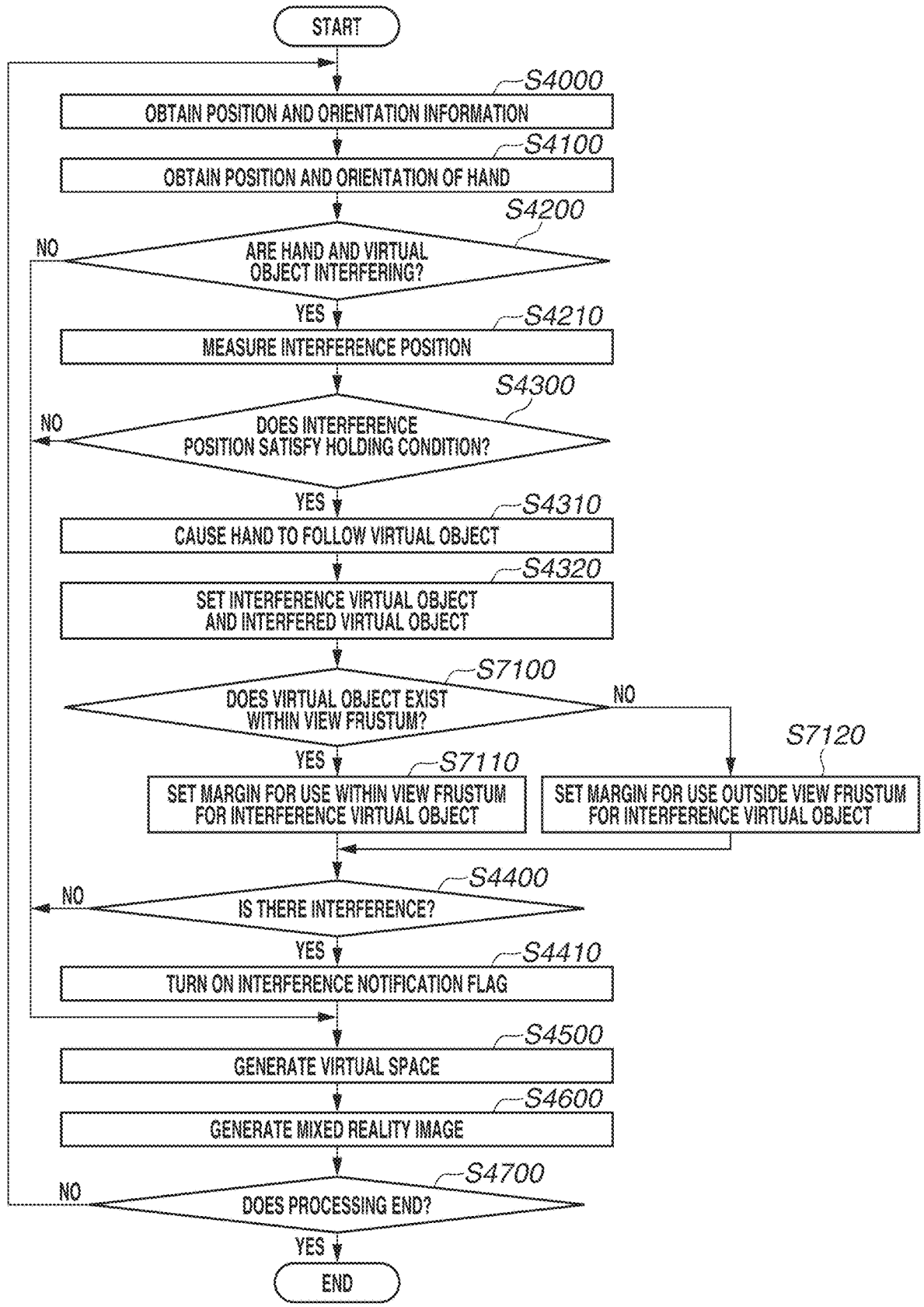
FIG. 7 is a flowchart illustrating an example of a processing procedure performed by the information processing apparatus.

FIG. 7 is a flowchart illustrating an example of a processing procedure performed by the information processing apparatus 1000 according to the present exemplary embodiment.

Specifically, each processing illustrated in FIG. 7 indicates processing for setting a different margin according to a position of the interference virtual object based on the view frustum information obtained by the information processing apparatus 1000 via the view frustum information obtaining unit 6020.

Each processing illustrated in FIG. 7 is executed mainly by each functional unit implemented by a CPU 2010. In addition, the same processing as each processing illustrated in FIG. 4 is denoted by the same reference numeral, and description thereof will be omitted.

Figure 8:
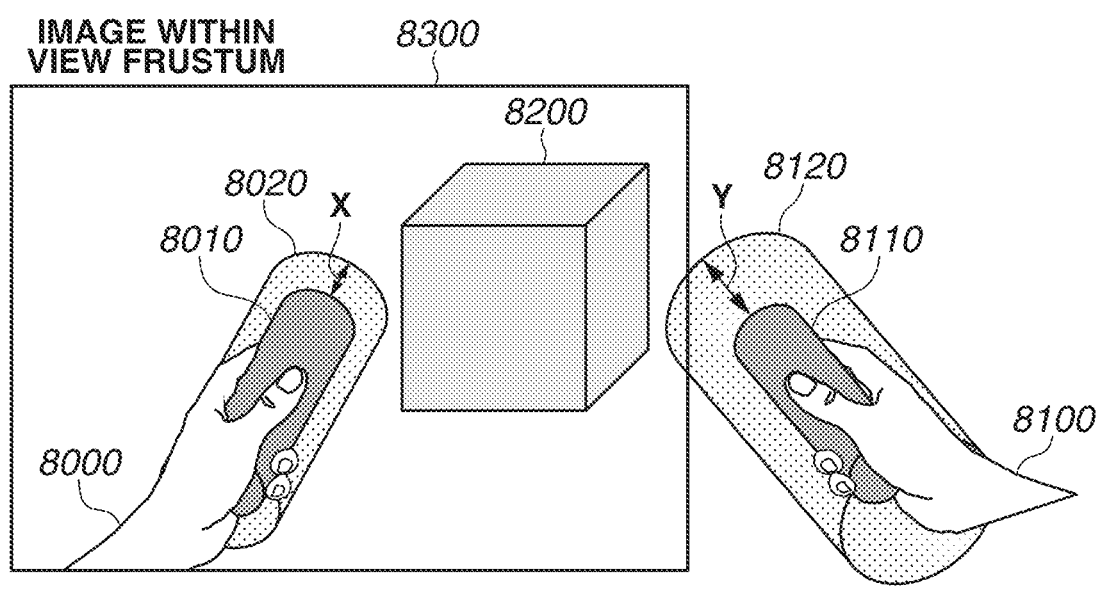
FIG. 8 is a diagram for description of a series of processing in which the information processing apparatus sets a margin.

FIG. 8 is a diagram for description of a series of processing in which the information processing apparatus 1000 according to the present exemplary embodiment sets a margin.

Specifically, in a virtual space including an interfered virtual object 8200 and interference virtual objects 8010 and 8110 respectively held by hands 8000 and 8100 of the user, the information processing apparatus 1000 sets a margin based on the a position and orientation of the interference virtual object and an HMD visual field image 8300.

Hereinafter, the details of processing will be described using FIGS. 7 and 8.

The view frustum information obtaining unit 6020 obtains view frustum information necessary for determining the HMD visual field image 8300.

The interference virtual object position determination unit 6030 determines, from the position and orientation and view frustum information about the interference virtual object, whether the interference virtual object exists within or outside the view frustum (step S7100). In a case where the interference virtual object exists within the view frustum (YES in step S7100), the processing proceeds to step S7110. In a case where the interference virtual object exists outside the view frustum (NO in step S7100), the processing proceeds to step S7120.

The margin setting unit 1023 sets a margin 8020 for use within the view frustum for the interference virtual object 8010 (step S7110). Since the setting of the margin for use within the view frustum is similar to the processing in step S4330 (see FIG. 4), the details thereof are omitted.

The margin setting unit 1023 sets a margin 8120 for use outside the view frustum for an interference virtual object 8110 (step S7120).

For example, the interference virtual object 8110 existing outside the view frustum is more likely to falsely interfere with the interfered virtual object 8200. Therefore, the margin 8120 which is an interference warning area between the interference virtual object 8110 and the interfered virtual object 8200 needs to be large, and accordingly, the margin 8120 having a gap amount Y relatively larger than a specified gap amount X is set.

In addition, since it is difficult that the interference virtual object 8110 existing outside the view frustum performs detailed work, the margin 8120 to be set also for reduction of a calculation amount does not need to be detailed. Therefore, a margin with a relatively less number of polygons than the margin 8020 set within the view frustum is set.

As described above, the information processing apparatus 1000 according to the present exemplary embodiment can change the margin to be set according to the determination result as to whether the interference virtual object exists in the view frustum.

In the first and second exemplary embodiments, the case where a single user is experiencing a mixed reality space has been described as an example. In a third exemplary embodiment, a case where a plurality of users simultaneously experiences a mixed reality space will be described as an example.

The functional configurations described in the first and second exemplary embodiments are denoted by the same reference numerals and description thereof is omitted.

Figure 9:
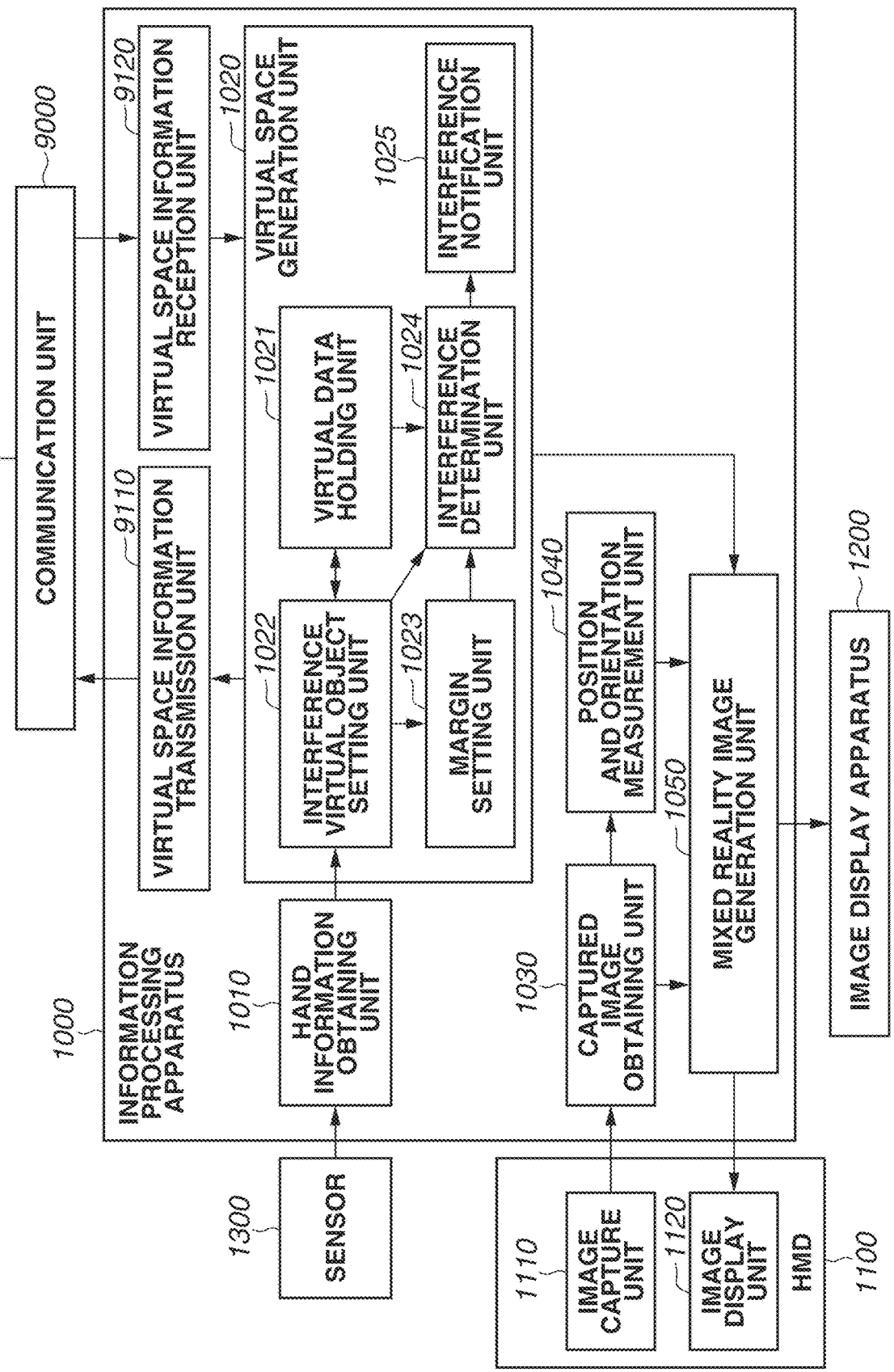
FIG. 9 is a block diagram illustrating an example of a functional configuration of a system according to one or more aspects of the present disclosure.

FIG. 9 is a block diagram illustrating an example of a functional configuration of a system according to the third exemplary embodiment.

A difference between the system S illustrated in FIG. 1 and the system according to the present embodiment is that an information processing apparatus 1000 includes a communication unit 9000, a virtual space information transmission unit 9110, and a virtual space information reception unit 9120.

The communication unit 9000 connects to the network to communicate with another information processing apparatus sharing the same virtual space. The communication unit 9000 transmits virtual space information transmitted from the virtual space information transmission unit 9110 to the virtual space information reception unit 9120 of another information processing apparatus.

The virtual space information transmission unit 9110 obtains virtual space information generated by a virtual space generation unit 1020, that is, position and orientation change information about a virtual object, and inputs the position and orientation change information to the communication unit 9000.

The virtual space information reception unit 9120 obtains the virtual space information received via the communication unit 9000 and inputs the virtual space information to the virtual space generation unit 1020.

For position and orientation information and margin information about the virtual object and notification information about interference determination obtained by the respective units, the virtual space generation unit 1020 generates a virtual space by reflecting the virtual space information input by the virtual space information reception unit 9120. The information of the generated virtual space (the virtual space information) is input to a mixed reality image generation unit 1050.

Figure 10:
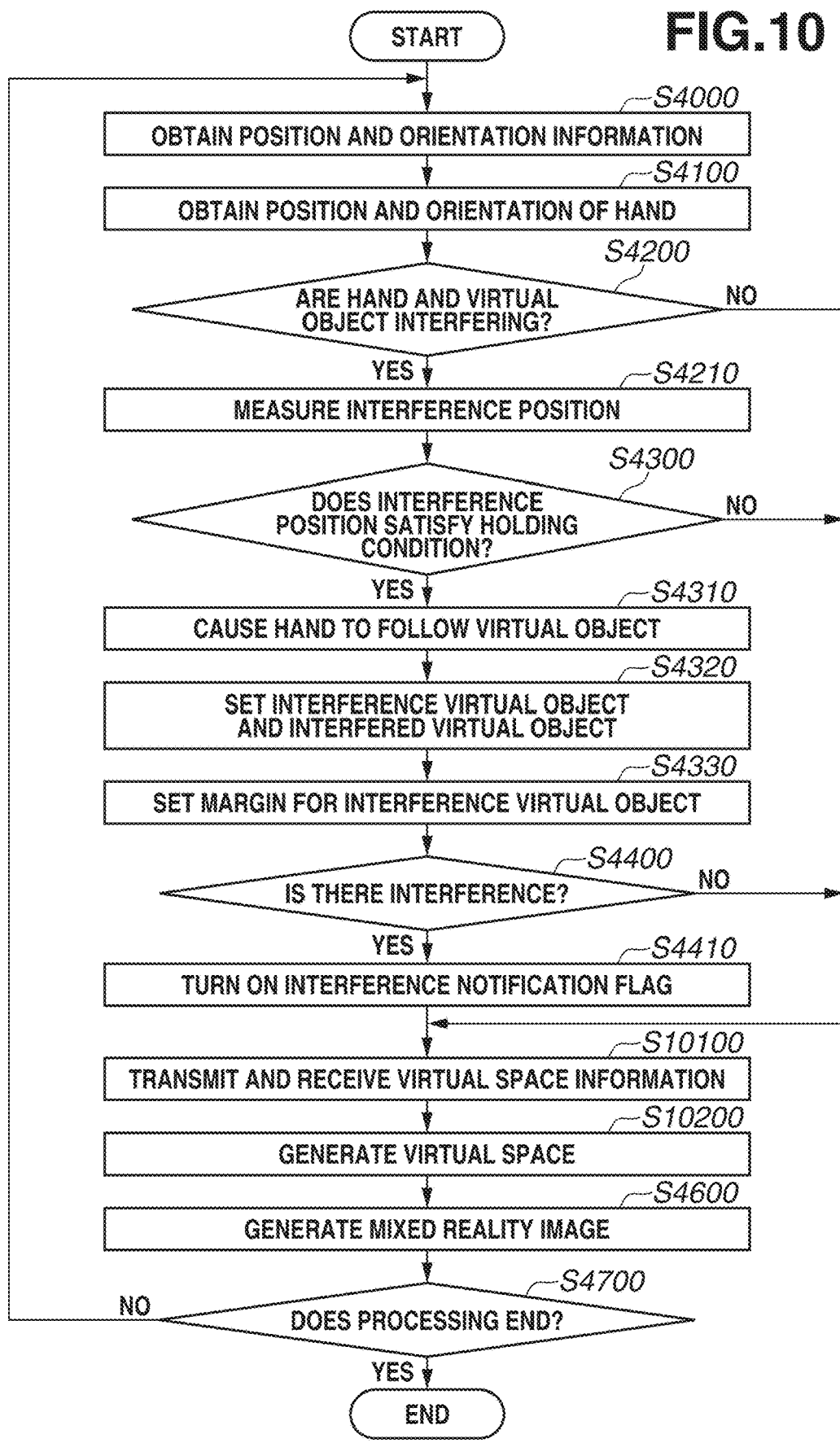
FIG. 10 is a flowchart illustrating an example of a processing procedure performed by the information processing apparatus.

FIG. 10 is a flowchart illustrating an example of a processing procedure performed by the information processing apparatus 1000 according to the present exemplary embodiment.

Specifically, each processing illustrated in FIG. 10 indicates processing for generating a mixed reality image based on virtual space information about the other information processing apparatus obtained by the information processing apparatus 1000 via the virtual space information reception unit 9120.

Each processing illustrated in FIG. 10 is executed mainly by each functional unit implemented by a CPU 2010. In addition, the same processing as each processing illustrated in FIG. 4 is denoted by the same reference numeral, and description thereof will be omitted.

FIGS. 11A to 11D are diagrams for description of a series of processing in which the information processing apparatus sets a margin.

Figure 11B:
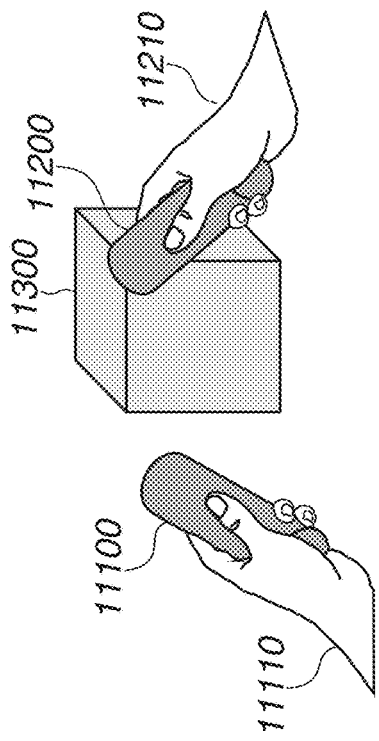
FIGS. 11A to 11D are diagrams for description of a series of processing in which the information processing apparatus sets a margin.
Figure 11D:
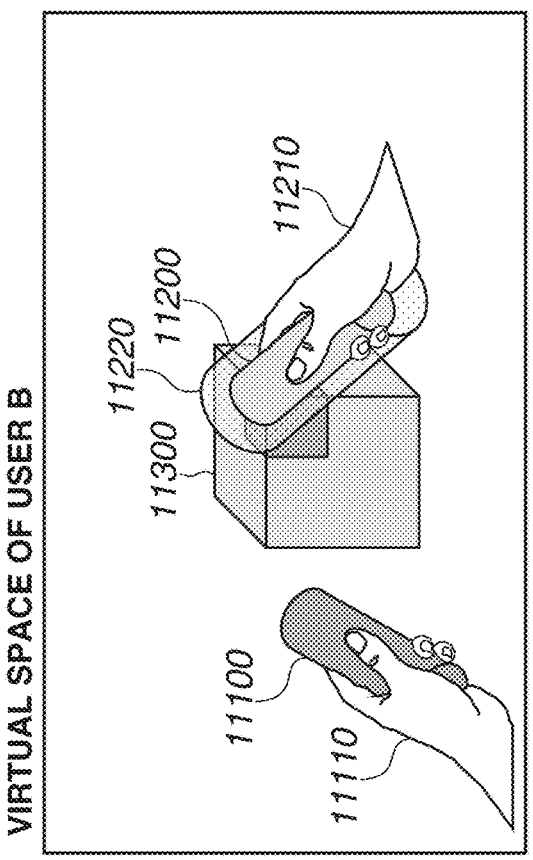
Figure 11A:
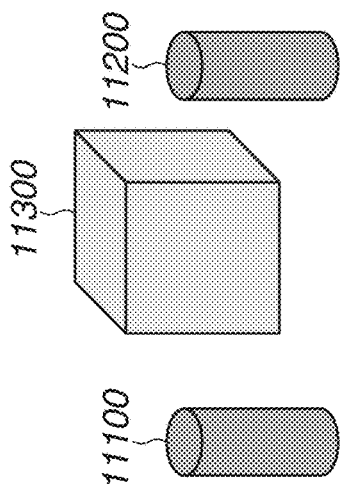

FIG. 11A illustrates an initial state of a virtual space including virtual objects 11100, 11200, and 11300 experienced by a user A and a user B.

FIG. 11B is a diagram illustrating a virtual space including the interference virtual object 11100 held by a hand 11110 of the user A, the interference virtual object 11200 held by a hand 11210 of the user B, and the interfered virtual object 11300. The interference virtual object 11200 is assumed to interfere with the interfered virtual object 11300.

Figure 11C:
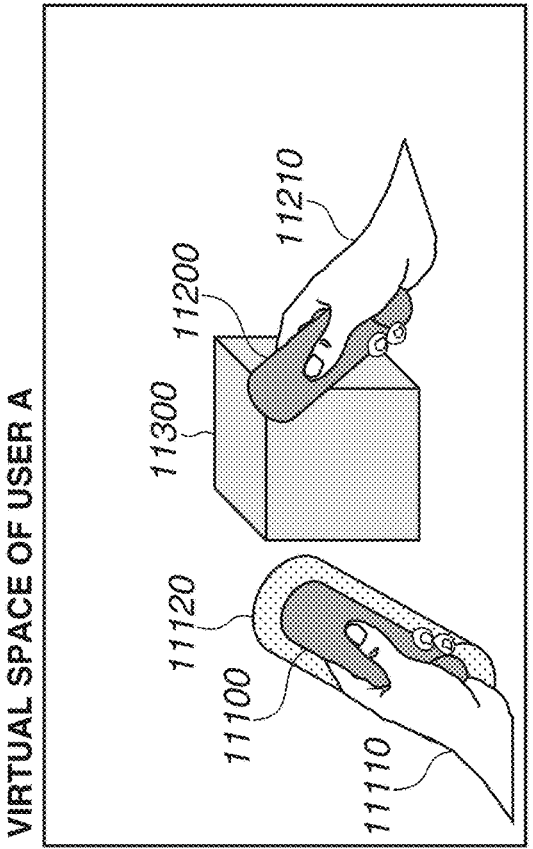

FIG. 11C illustrates a virtual space experienced by the user A, and FIG. 11D illustrates a virtual space experienced by the user B.

Hereinafter, the details of processing will be described with reference to FIG. 10 and FIGS. 11A to 11D.

The virtual space information transmission unit 9110 transmits and receives position and orientation change information about the virtual object (step S10100).

Specifically, in the virtual space changed from the state illustrated in FIG. 11A to the state illustrated in FIG. 11B, the position and orientation change information about the virtual object by the user A, that is, the position and orientation change information about the virtual object 11100 is transmitted via the communication unit 9000 to the user B.

In addition, the position and orientation change information about virtual object by the user B, that is, the position and orientation change information about the virtual object 11200 is transmitted to the user A via the communication unit 9000. The position and orientation change information about the virtual object transmitted in this manner is obtained by each user by the virtual space information reception unit 9120.

The virtual space generation unit 1020 generates a virtual space based on data on the virtual space held by a virtual data holding unit 1021, the margin information set by the margin setting unit 1023, and notification of the interference notification unit 1025 (step S10200).

In this case, for example, the virtual space of the user A changes from the state illustrated in FIG. 11A to the state illustrated in FIG. 11C, and a position and orientation of the interference virtual object 11100 held by the user A are changed, and a margin 11120 is set.

On the other hand, the virtual space of the user B changes from the state illustrated in FIG. 11A to the state illustrated in FIG. 11D, and a position and orientation of the interference virtual object 11200 held by the user B are changed, and a margin 11220 is set.

As illustrated in FIG. 11D, the interference virtual object 11200 interferes with the interfered virtual object 11300. Therefore, based on an interference notification flag of the interference notification unit 1025, the presence of interference is visually notified using color, for example, so that the user can understand an interference position.

In addition, the CPU 2010 generates a virtual space based on the position and orientation change information about the virtual object input by the virtual space information obtaining unit 6120. In this case, the virtual space of the user A changes from the state illustrated in FIG. 11A to the state illustrated in FIG. 11C, and a position and orientation of the interference virtual object 11200 held by the user B is changed.

On the other hand, the virtual space of the user B changes from the state illustrated in FIG. 11A to the state illustrated in FIG. 11D, and the position and orientation of the interference virtual object 11100 held by the user A is changed.

As described above, in the information processing apparatus 1000 according to the present exemplary embodiment, when a plurality of users simultaneously experiences a mixed reality space, the plurality of users can mutually share a position and orientation of a virtual object. Further, by not sharing information about interference (margin information and notification of an interference position) in a virtual space, the plurality of users can efficiently experience the mixed reality space.

In the present exemplary embodiment, the method is described in which the virtual space information (the margin information and the notification of the interference position) related to the interference is not shared by transmitting and receiving only the position and orientation change information about the virtual object, but the present disclosure is not limited to thereto.

For example, in the virtual space information transmission unit 9110 and the virtual space information reception unit 9120, not only the position and orientation change information about the virtual object but also the margin information and the interference notification information are transmitted/received to be reflected in the virtual space generation unit 9130. In this way, it is possible to employ a configuration using a method for sharing the virtual space information about the interference.

Although a method in which a plurality of users shares the same virtual space information has been described in the present exemplary embodiment, but the present disclosure is not limited thereto.

For example, user information is added to the virtual space information and transmitted via the virtual space information transmission unit 9110, and the virtual space information is selectively obtained based on the user information via the virtual space information reception unit 9120. Then, the virtual space information is reflected in the generation of the virtual space by the virtual space generation unit 9130. In this way, it is also possible to employ a configuration using a method for selectively sharing the virtual space information based on the user information.

For example, the position and orientation and the interference of the virtual space can be shared with a user experiencing the mixed reality space at the same site, but only the position and orientation of the virtual objects can be shared with a user experiencing the mixed reality space at a remote site. Alternatively, the information processing apparatus can be configured such that the position and orientation and the interference of the virtual space are shred with a user selected by using the input I/F 2040, but only the position and orientation of the virtual object is shared with an unselected user.

In the above description of each exemplary embodiment, a case is described as an example where the present disclosure is applied to a mixed reality (MR) system which displays an image obtained by combining a virtual space image with a captured image, but the present disclosure is not limited thereto.

For example, the present disclosure can be applied to a virtual reality (VR) system which displays only a virtual space image. In this case, in each exemplary embodiment, the mixed reality image generation unit 1050 can be configured to display a virtual space image as it is on the image display unit 1120 and the image display apparatus 1200.

Specifically, the virtual space image is not superimposed on a real space image obtained by the captured image obtaining unit 1030. Further, in a case where the present disclosure is applied to such a VR system, the captured image obtaining unit 1030 may not be provided.

The above-described exemplary embodiments are intended to more specifically describe the present disclosure, and the scope of the present disclosure is not limited to these examples.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-124802, filed Jun. 27, 2017, which is hereby incorporated by reference herein in its entirety.

What is claimed is:

1. An information processing apparatus comprising at least one processor and memory storing instructions to be executed by the processor, wherein when the instructions are executed by the processor, the information processing apparatus controls functions as:
  a holding unit configured to hold position and orientation information and shape information about a plurality of virtual objects in a virtual space;
  an obtaining unit configured to obtain position and orientation information and shape information about a real holding object configured to hold at least one of the plurality of virtual objects;
  a setting unit configured to set a virtual object held by the real holding object as an interference virtual object and to set a virtual object that is not held by the real holding object as an interfered virtual object, based on the position and orientation information and the shape information about the plurality of virtual objects and the position and orientation information and the shape information about the real holding object;
  a determination unit configured to determine presence or absence of interference between the interference virtual object and the interfered virtual object, based on the position and orientation information and the shape information about the interference virtual object and the position and orientation information and the shape information about the interfered virtual object; and
  a generation unit configured to generate the virtual space, based on the information held by the holding unit and a determination result of the determination unit.

2. The information processing apparatus according to claim 1, further comprising:
  an image obtaining unit configured to obtain a captured image obtained by capturing an image of a real space;
  an image generation unit configured to generate a virtual space image, based on the captured image and the virtual space generated by the generation unit; and
  a display unit configured to display, on a display screen, an image obtained by superimposing the captured image and the virtual space image.

3. The information processing apparatus according to claim 1, wherein the real holding object is a hand of a user holding the virtual object.

4. The information processing apparatus according to claim 1, further comprising a notification unit configured to, in a case where the determination unit determines that the interference is present, issue a notification of the interference.

5. The information processing apparatus according to claim 4, wherein the notification unit issues a notification of the interference by changing a display mode of a portion determined that the interference is present.

6. The information processing apparatus according to claim 4, wherein the notification unit issues a notification of the interference by emitting sound in a case where the interference is determined to be present.

7. The information processing apparatus according to claim 4, wherein the notification unit issues a notification of the interference by generating vibration in a case where the interference is determined to be present.

8. The information processing apparatus according to claim 1, further comprising a margin setting unit configured to set an area for checking whether a predetermined gap amount is secured between the interference virtual object and the interfered virtual object,
  wherein the determination unit determines presence or absence of interference between the set area and the interfered virtual object.

9. The information processing apparatus according to claim 8, wherein the margin setting unit sets the area for checking whether the predetermined gap amount can be secured between the interference virtual object and the interfered virtual object, by including the real holding object holding the virtual object in the interference virtual object.

10. The information processing apparatus according to claim 8, wherein the generation unit generates the virtual space with the area set by the margin setting unit being a virtual object.

11. The information processing apparatus according to claim 8, further comprising a second obtaining unit configured to obtain a view frustum for a display unit,
  wherein the determination unit determines whether the interference virtual object exists within the view frustum, and
  wherein the margin setting unit sets the area according to the determination result of the determination unit.

12. The information processing apparatus according to claim 8, further comprising a display unit configured to display the area set by the margin setting unit on a display screen.

13. The information processing apparatus according to claim 12, wherein the display unit is an optical see-through type display apparatus.

14. The information processing apparatus according to claim 12, wherein the display unit is a video see-through type display apparatus.

15. The information processing apparatus according to claim 12, wherein the display unit is a display apparatus configured to be mountable to a head of a user.

16. The information processing apparatus according to claim 1, further comprising:
  a transmission unit configured to transmit the virtual space generated by the information processing apparatus to another information processing apparatus different from the information processing apparatus; and
  a reception unit configured to obtain, as virtual space information, a virtual space generated by the other information processing apparatus, wherein the generation unit generates the virtual space by reflecting the obtained virtual space information when the virtual space is generated.

17. The information processing apparatus according to claim 16, wherein the reception unit selectively obtains a virtual space to be reflected from among the generated virtual space.

18. The information processing apparatus according to claim 1, further comprising an image obtaining unit configured to obtain a captured image obtained by capturing an image of a real space,
wherein the obtaining unit obtains the position and orientation information and the shape information about the real holding object, based on feature information extracted from the captured image.

19. A control method of an information processing apparatus, comprising:
holding, in a holding unit, position and orientation information and shape information about a plurality of virtual objects in a virtual space;
obtaining position and orientation information and shape information about a real holding object configured to hold at least one of the plurality of virtual objects;
setting a virtual object held by the real holding object as an interference virtual object and setting a virtual object that is not held by the real holding object as an interfered virtual object, based on the position and orientation information and the shape information about the plurality of virtual objects and the position and orientation information and the shape information about the real holding object;
determining presence or absence of interference between the interference virtual object and the interfered virtual object, based on the position and orientation information and the shape information about the interference virtual object and the position and orientation information and the shape information about the interfered virtual object; and
generating the virtual space, based on the information held by the holding unit and a result of the determining.

20. A non-transitory computer-readable storage medium storing a computer program for causing a computer to function as:
a holding unit configured to hold position and orientation information and shape information about a plurality of virtual objects in a virtual space;
an obtaining unit configured to obtain position and orientation information and shape information about a real holding object configured to hold at least one of the plurality of virtual objects;
a setting unit configured to set a virtual object held by the real holding object as an interference virtual object and to set a virtual object that is not held by the real holding object as an interfered virtual object, based on the position and orientation information and the shape information about the plurality of virtual objects and the position and orientation information and the shape information about the real holding object;
a determination unit configured to determine presence or absence of interference between the interference virtual object and the interfered virtual object, based on the position and orientation information and the shape information about the interference virtual object and the position and orientation information and the shape information about the interfered virtual object; and
a generation unit configured to generate the virtual space, based on the information held by the holding unit and a determination result of the determination unit.

* * * * *